United States Patent
Ten Eyck et al.

(10) Patent No.: US 7,442,163 B2
(45) Date of Patent: Oct. 28, 2008

(54) HUMIDIFICATION CONTROL SYSTEM FOR INFANT CARE APPARATUS

(75) Inventors: Lawrence G. Ten Eyck, Ellicott City, MD (US); Daniel F. Strauch, Mount Airy, MD (US)

(73) Assignee: General Electric Company, Schenectady, NY (US)

( * ) Notice: Subject to any disclaimer, the term of this patent is extended or adjusted under 35 U.S.C. 154(b) by 1 day.

(21) Appl. No.: 11/315,769

(22) Filed: Dec. 22, 2005

(65) Prior Publication Data

US 2007/0149843 A1    Jun. 28, 2007

(51) Int. Cl.
*A61G 11/00* (2006.01)
(52) U.S. Cl. ......................................................... 600/22
(58) Field of Classification Search .................... 600/21, 600/22; 119/452, 448; 219/497; 128/203.17, 128/203.27; 392/336
See application file for complete search history.

(56) References Cited

U.S. PATENT DOCUMENTS

| | | | | |
|---|---|---|---|---|
| 4,079,728 A | * | 3/1978 | Gatts | 600/22 |
| 4,481,938 A | | 11/1984 | Lindley | |
| 4,602,503 A | * | 7/1986 | Hile et al. | 73/865.6 |
| 5,056,547 A | * | 10/1991 | Brownawell | 137/3 |
| 5,316,542 A | | 5/1994 | Koch et al. | |
| 5,415,618 A | | 5/1995 | Koch | |
| 5,446,934 A | | 9/1995 | Frazier | |
| 5,799,614 A | * | 9/1998 | Greenwood | 119/452 |
| 6,322,502 B1 | | 11/2001 | Schoenberg et al. | |
| 6,409,654 B1 | | 6/2002 | McClain | |
| 2004/0176983 A1 | | 9/2004 | Birkett et al. | |
| 2004/0267087 A1 | * | 12/2004 | Ogata | 600/22 |
| 2005/0080316 A1 | * | 4/2005 | Severns | 600/22 |

FOREIGN PATENT DOCUMENTS

| | | |
|---|---|---|
| EP | 1 520 572 | 4/2005 |
| GB | 1591127 | 6/1981 |
| GB | 2230457 | 10/1990 |
| WO | WO97/48363 | 12/1997 |

* cited by examiner

*Primary Examiner*—Samuel G. Gilbert
(74) *Attorney, Agent, or Firm*—Roger M. Rathbun

(57) ABSTRACT

An infant care apparatus for supporting an infant upon an infant platform having a humidification control system. The user can initial select a manual mode where the humidity is inputted through a user input to control the humidity within an infant compartment. The system has an automatic mode where the user can then input humidity levels and a successive time periods to establish a protocol for controlling the humidity within the infant compartment over the time period the infant is being treated within the infant care apparatus. Each successive time period inputted by the user has a different humidity level associated herewith. As a further feature, there is an evaluation system to monitor whether the infant has been overstressed by any of the automatic reductions in the levels of humidity.

18 Claims, 1 Drawing Sheet

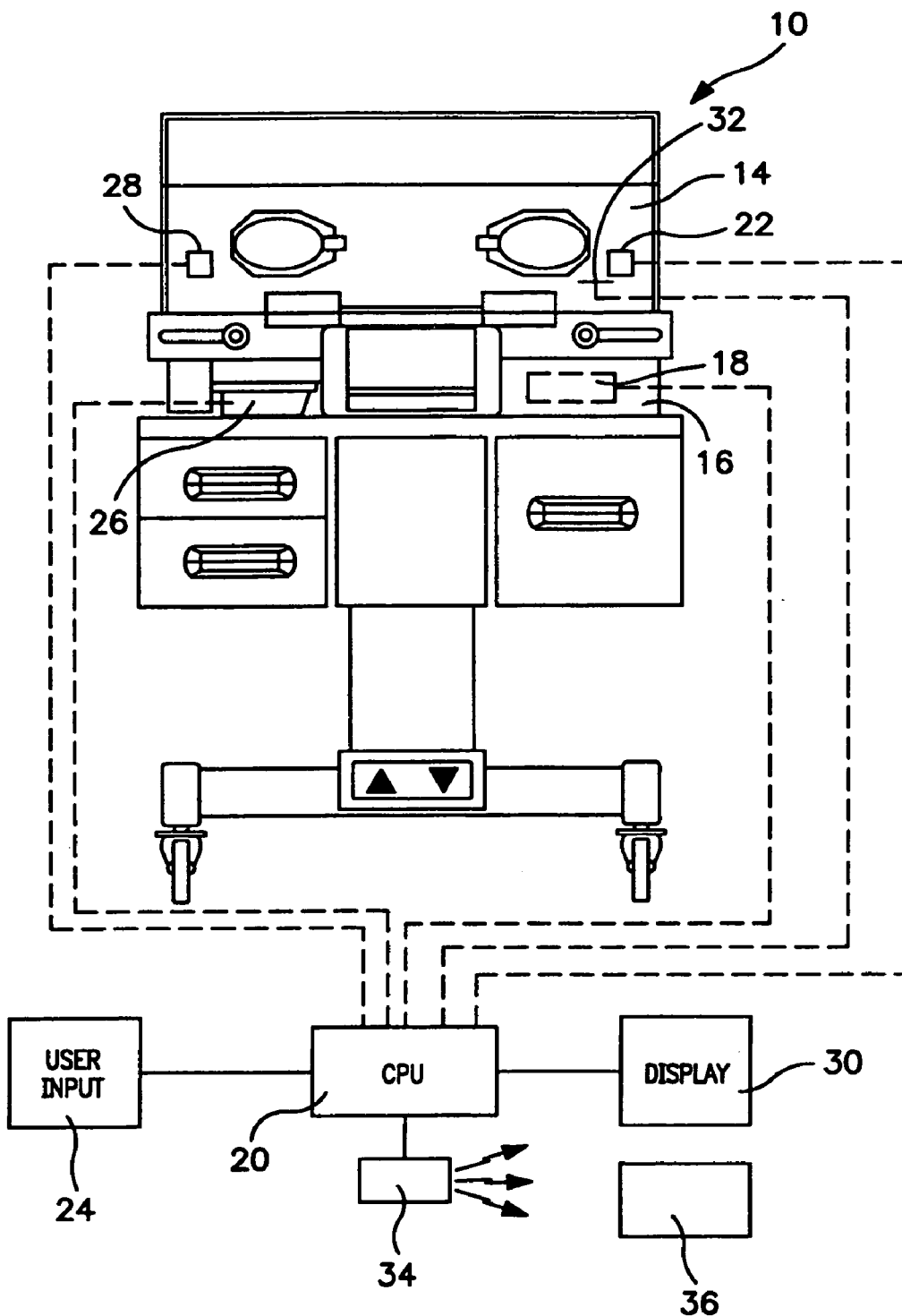

HUMIDIFICATION CONTROL SYSTEM FOR INFANT CARE APPARATUS

BACKGROUND

The present invention relates to an infant care apparatus and, more particularly, to an infant warming apparatus having a customized humidification control system that effectively weans the infant away from reliance upon the infant care apparatus It is quite common in the care of infants to provide a controlled atmosphere within which the infant is contained for the wellbeing of that infant. A typical infant incubator is shown and described in U.S. Pat. No. 4,936,824 of Koch et al.

As such, there is an infant compartment for the infant where the environment is carefully controlled so as to provide a heated atmosphere to the infant and generally will also include some control of the humidity within that infant compartment. In general, high humidity environments, greater than 80% Relative Humidity (RH) are typically used to maintain skin integrity, reduce insensible water loss and assist in maintaining the body temperature of very low birth weight infants. Such high humidity environments are normally maintained by a servo-controlled feedback loop within the infant compartment where the user simply inputs a desired temperature and humidity and there is a temperature sensor and a humidity sensor located within the infant compartment that provides a feedback signal to the controller that establishes the temperature and humidity inputted by the user.

Once set, therefore, a heating system and a humidification system maintain the user set values for temperature and relative humidity and will maintain those values without variation unless the user sets a new value for the temperature of relative humidity or the system responds to a sensed infant temperature to make an appropriate adjustment in the heating to offset a change in the infant's temperature, that is, the incubator may, in one mode of control, automatically increase the temperature within the infant compartment by increasing the power to the convective heater in response to a reduction of the infant's temperature.

As the infant matures, however, it requires lower levels of humidity and lower set temperatures to maintain its body temperature. A nurse will, from time to time, make individual challenges to the infant's self-control of thermal regulation by reducing either the humidity or temperature or both. This "weaning trial" is a manual action with manual observation of the infant's success at maintaining its body temperature during the challenge. Over successive weaning trials, the infant will eventually be moved from a temperature regulated environment to an open bassinet.

In the control of humidity, it is often advantageous to be able to vary the humidity in accordance with the needs of the infant and after an assessment by an attending caregiver. That control or variation of the humidity level within the infant compartment may also be under the control of a preprogrammed protocol that is established by the manufacturer of the incubator such that the humidity is automatically varied i.e. reduced in accordance with some pre-established program.

As an example, in U.S. Pat. No. 4,079,728 of Gatts, there is incorporated into the apparatus, a preset program that initially provides a relatively high humidity and then gradually lowers the humidity so as to wean the infant away from the humidified atmosphere so that, eventually, the controlled humidity approaches that of the external ambient when the infant is ready to be taken off of the incubator.

With the Gatts system however, there is no control by the user, that is, the weaning process is carried out entirely by a program that is loaded into the system by the manufacturer. Thus, the Gatts system is not effective where the user wants to establish and use its own program for the automated control of humidity within the infant compartment. In addition, there is no system by which the user can verify that the Gatts control of humidification is operating properly and in accordance with the manufacturers program.

Accordingly, it would be advantageous to have a humidification control system that provides an automatic control of humidity within an infant compartment that would allow an input by a user so that the control of the humidity is customized in accordance with the desires of the user. In addition it would be advantageous to have a humidification control system that could provide an alert to the user in the event the infant is not well tolerating an automatic change in the humidity to allow the user to make an appropriate correction in the level of humidity to avoid stressing the infant.

SUMMARY OF THE INVENTION

Accordingly, the present invention relates to a system for controlling the humidity within an infant compartment of an infant care apparatus where the user has an input as to the long range automatic control of the humidity within the infant compartment.

Accordingly, with the present invention, there is an automated processor controlled humidification system to allow the user to set the particular protocol for the control of humidity within the incubator for a period of time so that the user can customize the humidification of the infant over an extended period of time.

The present control system provides a menu that allows the user to initially select between an automatic control of the humidity and a manual control. If the manual control is selected, the user can simply select the percent of relative humidity desired to be present in the infant compartment for care of the infant in a conventional manner. However, with the present control system, there is a predetermined timed cycle that constant alerts the user in the event that the level of humidity has not been changed, for example, the predetermined time period may be two days and the system provides a visual and/or audible alert to the user that the humidity has not been manually changed, preferable lowered, over that period of time. As such, the user is notified that the humidity has not been lowered in a manner so as to wean the infant from the high humidity for the two day period. As can be understood, that period of time can be set by the manufacturer of the apparatus as a default setting or may actually be inputted by the user at the initial use of the infant care apparatus.

If, on the other hand, the user selects the automatic mode, a further menu becomes available wherein the user can input both a humidity level as well as a time during which the humidity level is intended to be established within the infant compartment. For example, the user may select a humidity level at a low level up to 100 percent humidity and, in general, will initially input a high level of humidity for an initial period of time i.e. 100 percent humidity for 2 days. The user can then select a lower level of humidity for a further period of time i.e 80 percent humidity for the next two days and so forth.

Thus, by the input of a time period and humidity level, the user can customize a protocol for the levels of humidity within the infant compartment during the entire stay of the infant by selecting a high level of humidity for a selected period of time and then selecting a lower level for further selected periods of time until the infant is sufficiently stable to be removed from the incubator. There may be, of course, any number of time periods that can be inputted into the system and levels of humidity so that the user inputted protocol can be selected to provide a particular selected protocol for the humidity level provided to the infant.

Accordingly, with the present control system, the user can input an entire protocol of humidification over a period of days that control the level of humidity within the infant compartment over an extended period of time to be at the desired level determined by the user.

As a further feature of the present invention, the humidification control system can evaluate the conditions of the infant to determine if the inputted level of humidity, once established in the infant compartment, is sufficient for the particular infant. To carry out that evaluation, the processor of the present control system can continually monitor the temperature of the infant as well as other parameters, such as the level of heating that is being used to maintain the infant at the desired temperature.

For example, after an automatic lowering of humidity level, the control system can monitor the temperature of the infant to see that such temperature is being maintained at a desired level and, if the control system determines that the level of the infant temperature is being lowered, an alert is provide to the user advising the user that the level of humidity then being provided within the infant compartment may be to low at that particular time so that the user can take the necessary steps to manually control the humidity to the correct level to alleviate the stress on the infant or, alternatively, the user can reprogram the inputted protocol to raise the level of humidity and reset the later reducing levels at different settings that are less stressful to the infant.

Other parameters indicative of the status of the infant can also be evaluated in determining the ability of the infant to take the lowered humidity. One of such other parameters can be the rate of heat being supplied to the infant compartment. That may be measured, as an example, where a convective heating system is employed, by measuring the power to the heater, since a lowering of the infant's temperature conventionally raises the power to the convective heater in order to raise the temperature within the infant compartment to counter the lowering of the infant's temperature.

Thus, by monitoring the power to the convective heater, the processor can determine if the heater is being continuously, for example, operated at its maximum level, or at a high predetermined percentage of its maximum level, so that, again, there is a need to reevaluate the automatic reduction of humidity with the infant compartment to determine if the lowering of the humidity level has been too drastic and therefore a change needed to the humidity level by a user to reestablish a prior level of humidity to avoid overstressing the infant.

These and other features and advantages of the present invention will become more readily apparent during the following detailed description taken in conjunction with the drawings herein.

BRIEF DESCRIPTION OF THE DRAWINGS

The FIGURE is a schematic view of an infant care apparatus incorporating the present invention.

DETAILED DESCRIPTION OF THE INVENTION

Referring now to the FIGURE, there is shown an infant care apparatus 10 having an infant platform 12 that is adapted to underlie and support an infant being cared for therein. The infant is basically enclosed within an infant compartment 14 that surrounds the infant and the atmosphere within the infant compartment 14 is controlled for the wellbeing of the infant by controlling the heat and humidly therein.

In order to heat the infant compartment 14, there is a heating system that can be located in a heater compartment 16 located beneath the infant compartment 14. There is, therefore, a electrical heater 18 that is used to heat a flow of air to be introduced as warmed air into the infant compartment to provide warmth to the infant enclosed within the infant compartment 14. A typical infant care apparatus 10 is shown and described in U.S. Pat. No. 4,936,824 of Koch et al as an infant incubator and the heating system of the present invention can be of the convective type described therein.

While the convective type of heating system of the Koch et al patent is suitable for use with the present invention, other types of heating systems can be used where the systems are controllable in order to have control over the amount of heat produced by the particular heater.

As shown in the FIGURE, there can be a central processing unit (CPU) 20 that controls the electrical heater 18 and that control may be a conventional feedback type of control based upon an air temperature sensor 22 located within the infant compartment 14. As is conventional, the user can input a desired temperature by means of a user input 24 to the CPU 20 and the CPU 20 thereby controls the power to the heater 18 to establish the desired temperature within the infant compartment 14.

In a similar manner, there is a humidification system and which may include a conventional humidifier 26 that adds water vapor, generally to the stream of heated air that is introduced into the infant compartment 14, however, again, various types of controllable humidification systems can be used in connection with the present invention. In the exemplary embodiment, there is a humidity sensor 28 that is located with the infant compartment 14 and which provides a signal indicative of the level of humidity in the infant compartment 14 to the CPU 20 that, in turn, controls the humidifier 26 to provide the level of humidity therein in accordance with a desired value conventionally inputted by means of the user input 24.

As such, in the conventional systems, the user would input a desired set temperature and humidity via the user input 24 into the CPU 20 and that CPU 20 would respond to the signals from the temperature and humidity sensors 22, 28, respectively, to control both the heater 18 and the humidifier 26 in order to establish the actual temperature and humidity within the infant compartment 14 to be maintained at the particular level inputted by the user. As stated, the system of the Gatts, U.S. Pat. No. 4,079,728, however, is somewhat further automated wherein the manufacturer of the overall control system has decreed a specific pattern or protocol for the humidity over a period of time that is not alterable by the user.

With the present system, however, the infant care apparatus 10 includes a humidification control system that allows the user to input a customized protocol for the control of humidity within the infant compartment 14 over an extended period of time, including the entire time that the infant is present within the infant care apparatus 10.

In the use of the present invention, the user input 24 is used to input a desire protocol for that humidification as well as display various menus that the user can utilize in inputting the humidification protocol. Initially, the humidification system can display a menu to enable the user to select either a manual mode or an automatic mode.

If the manual mode is selected, the humidification control system operates similar to a conventional humidification system where the user can simply manually enter into the user input 24, the desired level of humidity for the infant compartment 14. Thereafter, the humidity sensor 28 continually or intermittently sends signals indicative to the humidity level within the infant compartment 14 to the CPU 20 that then controls the humidifier 26 to establish the inputted level of humidity within the infant compartment 14. As is normal with such manual mode operations, the level of humidity within the infant compartment 14 will then remain at the inputted level until the user makes a new entry into the user input 24 to change the humidity level.

With the present humidification system, however, there is an alert or warning provided to the user by means of a display 30 that may be visual, audible or both, and which alerts the user when a predetermined period of time has elapsed without any change of humidity level being entered into the user input 24. As previously explained, it is preferable to wean the infant from the higher levels of humidity within the infant compartment 14 over time so that the infant is ultimately acclimated to the ambient humidity and, therefore, the user normally reduces the level of humidity within the infant compartment 14 over time.

With the present humidification control system, when in its manual mode, the display 30 provides an alert to the user that there has been no lowering of the humidity level within the infant compartment during the predetermined elapsed period of time, such as, for example, two days so that the user can evaluate the situation and either reduce the humidity to start the weaning process or let the humidity level stay at its current level if the user determines that is the best course of action for the infant. The main purpose is simply to make the user aware of the lack of humidity level diminution so that some action or evaluation can be taken of the status of the infant.

The period of time that must pass before the alert is triggered can be inputted by the user into the user input 24 or can be pre-established by the manufacturer of the infant care apparatus 10 as a default setting.

As the alternative, if the user selects the automatic mode of operation of the humidification control system by means of the user input 24, the menu then allows the user to enter a time and a humidity level, that is, the user can enter a particular time period when a specific humidity level is to be maintained within the infant compartment 14, i.e 100 percent humidity for 2 days, and then subsequent times where lowered levels of humidity would be established within the infant compartment 14. By such inputting, the user can enter successive periods of time and specific levels of humidity desired during those periods of time over the entire course of the containment of the infant within the infant care apparatus 10. The time can be entered in the form of minutes, hours, days or the like and includes a beginning time and an ending time that will, of course, normally correspond with the beginning time for the next succeeding period of time.

As such, therefore, the user can independently determine the desired long term changes in humidity for a particular infant or universally for a particular institution. Thus a customized humidification protocol can be inputted into the present infant care apparatus and that protocol is thereafter followed in caring for the infant.

The humidification control system of the present invention also has a system for evaluating the infant during the automatic mode in order to assure that the infant is not over stressed by a change i.e lowering of the humidity within the infant compartment 14 where the infant is not capable of handling that reduced humidity at that time.

In that evaluation system, the CPU 20 basically monitors the infant to sense its condition with respect to its ability to handle the reductions of humidity as the humidity levels within the infant compartment 14 are automatically lowered by the humidification control system. There may be numerous methods of carrying out that monitoring of an infant and while representative methods will be explained herein, it will be understood, however, that there are other methods of monitoring the infant condition that are not specifically described herein but which are within the scope of the present invention.

Accordingly, one method or system for carrying out the evaluation of the infant is by means of an infant temperature sensor 32. The signals indicative of the infant's temperature are sent to the CPU 20 so that the CPU 20 can keep a continuous track of the infant temperature and establish a trending of that temperature.

As a result, each time the humidification control system of the present invention automatically lowers the humidity within the infant compartment 14, the CPU 20 can determine whether the temperature of the infant is affected. As such, after an automatic lowering of humidity level, if the humidification control system determines that the level of the infant temperature monitored by the CPU 20 has been lowered, an alert is provide to the user by means of the display 30 advising the user that the infant may not be well tolerating the reduced level of humidity and is being overly stressed. Thus the user can be warned that the level of humidity then being provided within the infant compartment may be too low at that particular time so that the user can manually raise the humidity to a higher level or re-input a time and humidity level into the CPU 20 to relieve the situation and alleviate the stress on the infant.

As an alternative method of evaluating the status of the infant resulting from a reduction in humidity within the infant compartment 14, the heating intensity can also be monitored. If the heater is being controlled by the infant skin temperature 32, the heater intensity will be increased as the infant temperature drops such that the CPU 20 can monitor the power to the heater 18 and if the power is at a maximum intensity for a prolonged period of time, it can be due to the infant being unable to handle the lower humidity and is being overstressed. Again, therefore, that situation can be detected by the CPU 20 and the CPU 20 will activate the display 30 to alert the user that the infant may have become overstressed by the automatic reduction in humidity so that the user can take corrective action.

Thus, by monitoring the power to the convective heater, the temperature of the infant or other means of evaluating the infant, the CPU 20 can determine if the infant has been overstressed by an automatic reduction in humidity so that the user can be alerted and take the necessary corrective action to determine if the lowering of the humidity level has been too drastic and therefore a change needed to the humidity level by the user to reestablish a prior level of humidity to avoid overstressing the infant.

Finally as a further feature of the present humidification control system, the CPU 20 can communicate to a transmitter 34 that can take all of the trended data from the operation of the infant care apparatus 10 and transmit that data to a central data storage facility 36 where all of the data for the particular health care facility may be assembled and stored.

Those skilled in the art will readily recognize numerous adaptations and modifications which can be made to the humidification control system of the present invention which will result in an improved system for an enclosed environment, yet all of which will fall within the scope and spirit of the present invention as defined in the following claims. Accordingly, the invention is to be limited only by the following claims and their equivalents.

We claim:

1. A infant care apparatus comprising an infant compartment adapted to enclose an infant to provide a controlled environment for the infant, the infant care apparatus having a heating system for heating the interior of the infant compartment to warm an infant therein, and a humidity system adapted to humidify the interior of the infant compartment to produce a relative humidity therein, and a humidification control system to control the relative humidity within the infant compartment, said humidification control system having a user input to enable the user to enter a plurality of successive individual times and a humidity level for each of the plurality of times into the control system to provide a control of the relative humidity within the infant compartment over a period of time, the infant apparatus further including a temperature sensor for ascertaining the temperature of an infant located within the infant compartment.

2. A infant care apparatus comprising an infant compartment adapted to enclose an infant to provide a controlled environment for the infant, the infant care apparatus having a heating system for heating the interior of the infant compartment to warm an infant therein, and a humidity system adapted to humidify the interior of the infant compartment to produce a relative humidity therein, and a humidification control system to control the relative humidity within the infant compartment, said humidification control system having a user input to enable the user to enter a plurality of successive individual times and a humidity level for each of the plurality of times into the control system to provide a control of the relative humidity within the infant compartment over a period of time wherein the humidification system includes an alert system that notifies the user when the humidity level within the infant compartment has remained unchanged for a predetermined time cycle.

3. The infant care apparatus as defined in claim 2 wherein the predetermined time cycle can be inputted into the humidification system by a user.

4. A infant care apparatus comprising an infant compartment adapted to enclose an infant to provide a controlled environment for the infant, the infant care apparatus having a heating system for heating the interior of the infant compartment to warm an infant therein, and a humidity system adapted to humidify the interior of the infant compartment to produce a relative humidity therein, and a humidification control system to control the relative humidity within the infant compartment, said humidification control system having a user input to enable the user to enter a plurality of successive individual times and a humidity level for each of the plurality of times into the control system to provide a control of the relative humidity within the infant compartment over a period of time wherein the humidification system further includes an evaluation system to evaluate the status of an infant within the infant compartment.

5. The infant care apparatus as defined in claim 4 wherein the evaluation system includes an infant temperature sensor that monitors the temperature of an infant after each change in humidity within the infant compartment and further includes an alert system that notifies the user if an infant is not maintaining a desired temperature.

6. The infant care apparatus as defined in claim 4 wherein the heating system includes an electric heater and wherein the evaluation system includes an electric power sensor that monitors the electrical power to the electric heater after each change in humidity within the infant compartment and further includes an alert system that notifies the user if the electric power exceeds a predetermined percent of maximum power for a predetermined time period.

7. A infant care apparatus comprising an infant compartment adapted to enclose an infant to provide a controlled environment for the infant, the infant care apparatus having a heating system for heating the interior of the infant compartment to warm an infant therein, and a humidity system adapted to humidify the interior of the infant compartment to produce a relative humidity therein, and a humidification control system to control the relative humidity within the infant compartment, said humidification control system having a user input to enable the user to enter a plurality of successive individual times and a humidity level for each of the plurality of times into the control system to provide a control of the relative humidity within the infant compartment over a period of time wherein the humidification control system includes an electronic storage media that stores data indicative of the relative humidity within the infant compartment over a predetermined period of time.

8. An infant care apparatus as defined in claim 7 wherein the humidification control system includes a wireless transmitter to send the data indicative of the relative humidity to a remote location for storage.

9. A humidification control system for controlling the humidity within an infant care apparatus having an enclosed compartment, said control system comprising:
a heating system for warming the enclosed compartment;
a humidifier for introducing water at a controlled rate into the enclosed compartment to humidify the enclosed compartment;
a controller for controlling the rate of water introduced by the humidifier to the enclosed compartment based upon a user input of time and humidity to the controller; and
an input device to enable a user to input a plurality of successive individual times and humidity levels for each of the individual times to the controller to control changes in humidity within the enclosed compartment over a period of time wherein the system includes a temperature sensor for ascertaining the temperature of an infant within the enclosed compartment.

10. The humidification control system of claim 9 wherein the controller includes a microprocessor.

11. The humidification control system of claim 9 wherein the controller further controls the temperature within the enclosed compartment.

12. A method of controlling the relative humidity within an enclosed compartment of an infant care apparatus, said method comprises the steps of:
heating the enclosed compartment to establish a known temperature within the enclosed compartment;
establishing a level of humidity in the enclosed compartment by introducing water into the enclosed compartment;
providing a controller to control the level of humidity in the enclosed compartment,
inputting to the controller a plurality of successive individual times and humidity levels for each of the individual times to control the humidity level over a period of time, and
ascertaining the temperature of an infant enclosed within the enclosed compartment at predetermined intervals.

13. The method as defined in claim 12 wherein the step of providing a controller to control the level of humidity in the enclosed compartment comprises providing a controller having a processor to control the level of the humidity.

14. The method as defined in claim 12 further including the step of determining whether the temperatures ascertained are in accordance with a desired temperature range.

15. The method as defined in claim 14 further including the step of providing a system for notifying a user when the ascertained temperatures are not within the desired temperature range.

16. The method as defined in claim 12 wherein the step of inputting to the controller a plurality of successive individual times and humidity levels comprises imputing individual times and humidity levels so as to reduce the level of humidity as a trend over time to approach the relative ambient humidity in the environment outside the enclosed compartment.

17. The method as defined in claim 12 wherein the method further comprises the step of recording and storing data relative to the relative humidity and temperature within the enclosed compartment.

18. The method as defined in claim 17 wherein the method further includes the step of transmitting the stored data relative to the relative humidity and temperature to a remote location to be stored at the remote location.

* * * * *